(12) United States Patent
Kluss et al.

(10) Patent No.: US 12,429,152 B2
(45) Date of Patent: Sep. 30, 2025

(54) TUBULAR CONNECTOR

(71) Applicant: RELIANCE WORLDWIDE CORPORATION, Atlanta, GA (US)

(72) Inventors: William Vernon Kluss, Woombye (AU); Eliana Pippen, Atlanta, GA (US); Randy Graves, Atlanta, GA (US)

(73) Assignee: Reliance Worldwide Corporation, Atlanta, GA (US)

( * ) Notice: Subject to any disclaimer, the term of this patent is extended or adjusted under 35 U.S.C. 154(b) by 0 days.

(21) Appl. No.: 18/753,404

(22) Filed: Jun. 25, 2024

(65) Prior Publication Data

US 2024/0401732 A1 Dec. 5, 2024

Related U.S. Application Data

(63) Continuation of application No. 17/932,024, filed on Sep. 14, 2022, now Pat. No. 12,049,974, which is a
(Continued)

(51) Int. Cl.
*F16L 41/03* (2006.01)
*F16L 37/091* (2006.01)
(Continued)

(52) U.S. Cl.
CPC ....... *F16L 37/0915* (2016.05); *F16L 55/1157* (2013.01); *F16L 41/021* (2013.01); *F16L 41/023* (2013.01); *F16L 41/03* (2013.01)

(58) Field of Classification Search
CPC ... F16L 37/0915; F16L 55/1157; F16L 37/091
See application file for complete search history.

(56) References Cited

U.S. PATENT DOCUMENTS

| 788,600 | A | 5/1905 | Rogers |
| D194,015 | S | 11/1962 | Stringham |

(Continued)

FOREIGN PATENT DOCUMENTS

| AT | 512772 B1 | * 11/2013 | ............ F16L 37/091 |
| DE | 10114326 A1 | 10/2002 | |

(Continued)

OTHER PUBLICATIONS

WO—International Patent Application No. PCT/CN2021/082998; Mar. 25, 2021; Reliance Worldwide Corporation.
(Continued)

*Primary Examiner* — Zachary T Dragicevich
*Assistant Examiner* — James A Linford
(74) *Attorney, Agent, or Firm* — Barnes & Thornburg LLP

(57) ABSTRACT

A connector includes a connecting body with a fluid passage at least part way therethrough, and a seal is provided with an outer portion of a fluid tube. A cartridge proximate to the connecting body has a hollow portion therethrough. A grab part has at least one tooth to retain the fluid tube and is between the cartridge and the seal. A demount part within the hollow portion moves the teeth to allow release of the fluid tube. A latch is located on one of the connecting body or a sleeve covering at least part of the cartridge or the connecting body. A mating catch is located on the other of the sleeve or the connecting body, and engagement of the latch with the catch connects the sleeve to the connecting body and helps restrain cartridge movement.

20 Claims, 6 Drawing Sheets

Related U.S. Application Data continuation of application No. 17/048,557, filed as application No. PCT/US2019/025851 on Apr. 4, 2019, now Pat. No. 11,525,534.

(60) Provisional application No. 62/718,562, filed on Aug. 14, 2018.

(51) Int. Cl.
*F16L 55/115* (2006.01)
*F16L 41/02* (2006.01)

(56) References Cited

U.S. PATENT DOCUMENTS

| | | | |
|---|---|---|---|
| 4,026,006 A | 5/1977 | Moebius | |
| D354,801 S | 1/1995 | Grant et al. | |
| 5,538,297 A | 7/1996 | McNaughton et al. | |
| 5,868,435 A | 2/1999 | Bartholomew | |
| D449,515 S | 10/2001 | Sato | |
| D461,545 S | 8/2002 | Nishio | |
| D482,761 S | 11/2003 | Gotoh et al. | |
| D615,165 S | 5/2010 | McAlpine et al. | |
| D638,919 S | 5/2011 | Grether | |
| D710,977 S | 8/2014 | Chen | |
| 8,813,348 B2 | 8/2014 | Williams et al. | |
| D713,943 S | 9/2014 | Luke | |
| D746,952 S | 1/2016 | Gledhill et al. | |
| D746,958 S | 1/2016 | Gledhill et al. | |
| 9,228,681 B2 | 1/2016 | Kluss | |
| D754,303 S | 4/2016 | Smith | |
| D823,442 S | 7/2018 | Sugatani et al. | |
| D886,250 S | 6/2020 | Ji Ho et al. | |
| D902,360 S | 11/2020 | Kluss et al. | |
| D908,846 S | 1/2021 | Kluss et al. | |
| D908,848 S | 1/2021 | Kluss et al. | |
| 10,969,047 B1 | 4/2021 | Crompton et al. | |
| D919,775 S | 5/2021 | Kluss et al. | |
| D943,407 S | 2/2022 | Buckley et al. | |
| D943,715 S | 2/2022 | Kwak et al. | |
| D984,597 S | 4/2023 | Wang | |
| D986,393 S | 5/2023 | Smith | |
| D990,300 S | 6/2023 | Liebelt | |
| D991,023 S | 7/2023 | Cooper et al. | |
| D996,581 S | 8/2023 | Li et al. | |
| D996,584 S | 8/2023 | Nakano et al. | |
| D999,345 S | 9/2023 | Yu | |
| D1,000,585 S | 10/2023 | Koiwa | |
| 11,796,101 B2 | 10/2023 | Watson et al. | |
| 2005/0285394 A1 | 12/2005 | Muto | |
| 2006/0244258 A1 | 11/2006 | Baumgartner | |
| 2009/0032170 A1 | 2/2009 | Williams | |
| 2011/0025054 A1 | 2/2011 | Kluss | |
| 2013/0181446 A1 | 7/2013 | Le Clinche | |
| 2016/0040812 A1 | 2/2016 | Lai | |
| 2016/0273695 A1 | 9/2016 | Bobo et al. | |
| 2017/0082229 A1 | 3/2017 | Meissner | |
| 2020/0378536 A1 | 12/2020 | Osteen et al. | |
| 2023/0288001 A1 | 9/2023 | Kluss et al. | |

FOREIGN PATENT DOCUMENTS

| | | |
|---|---|---|
| FR | 3086366 A1 | 3/2020 |
| GB | 1555640 | 11/1979 |
| GB | 2143918 A | 2/1985 |

OTHER PUBLICATIONS

WO—International Patent Application No. PCT/US2019/025851; Apr. 4, 2019; Reliance Worldwide Corporation.

\* cited by examiner

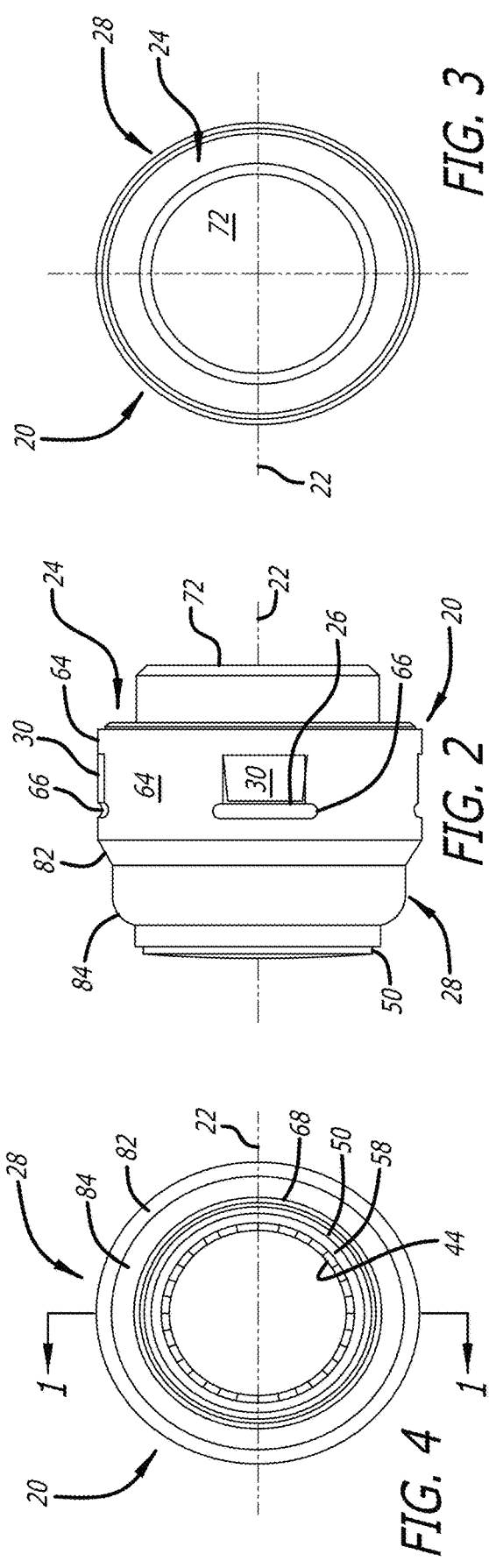

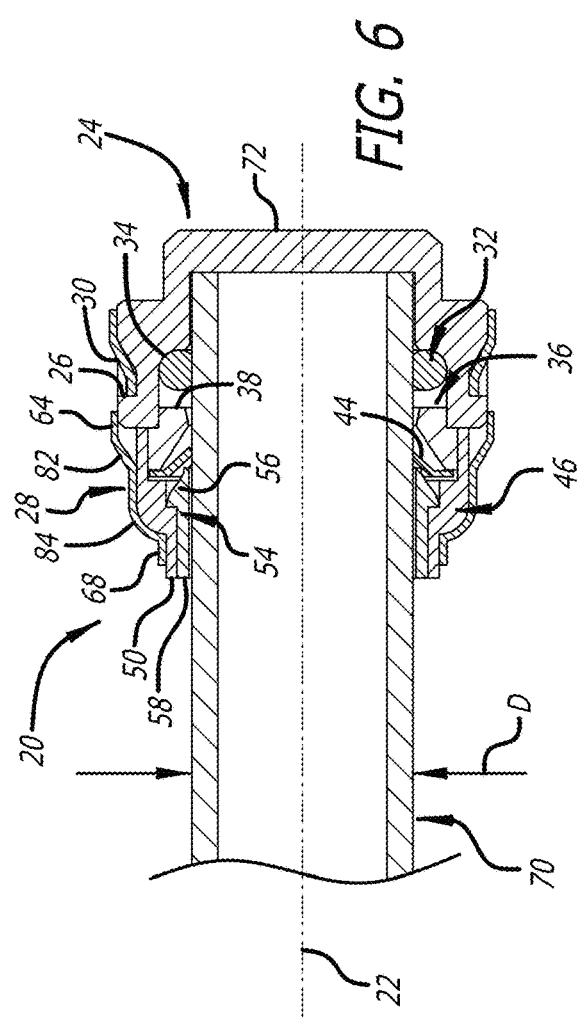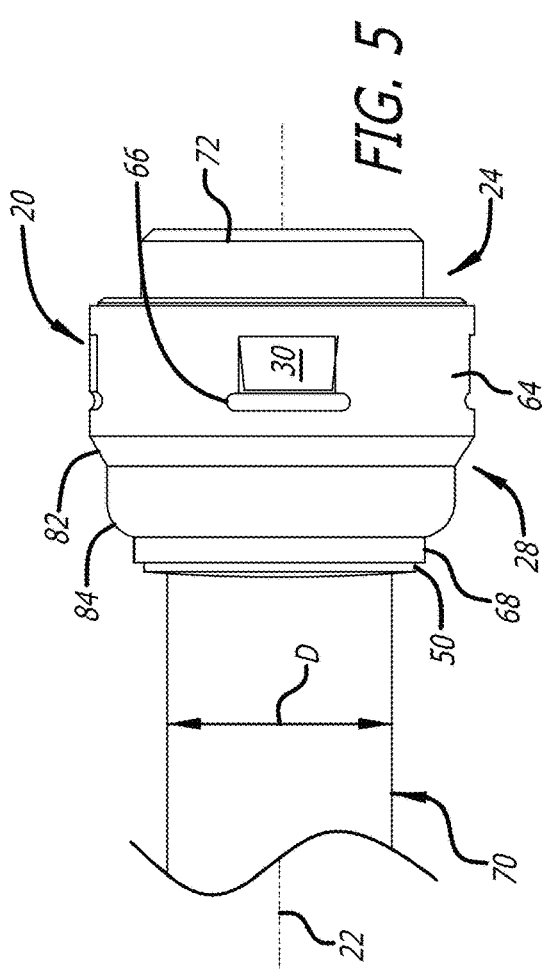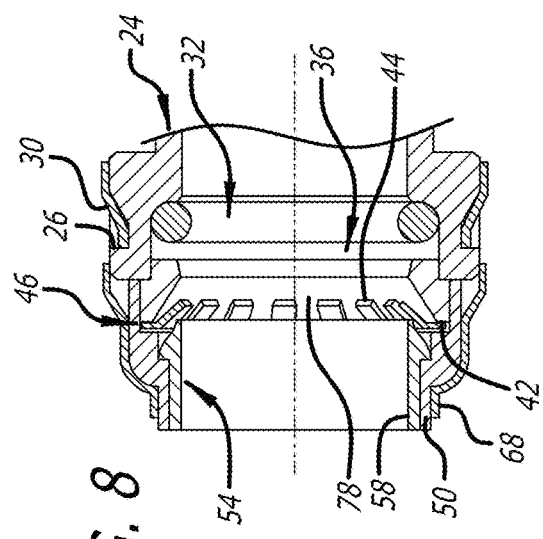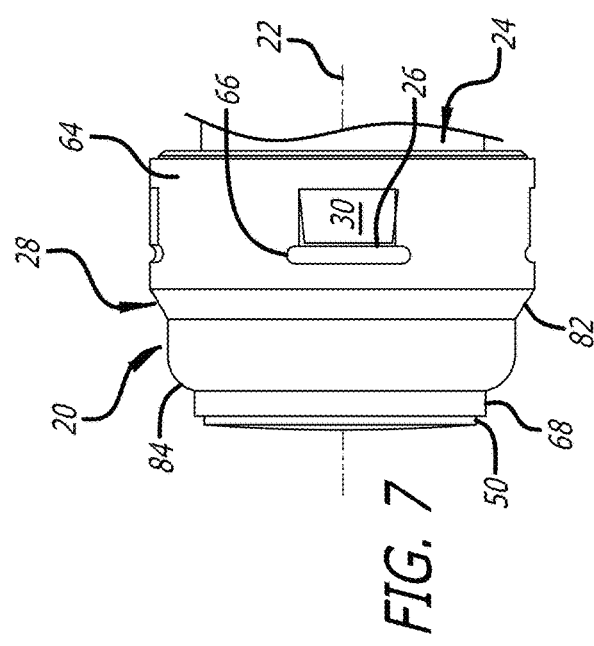

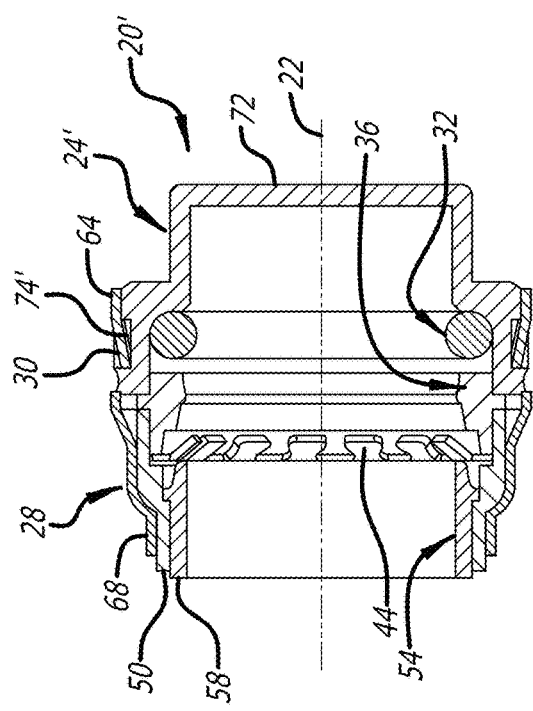
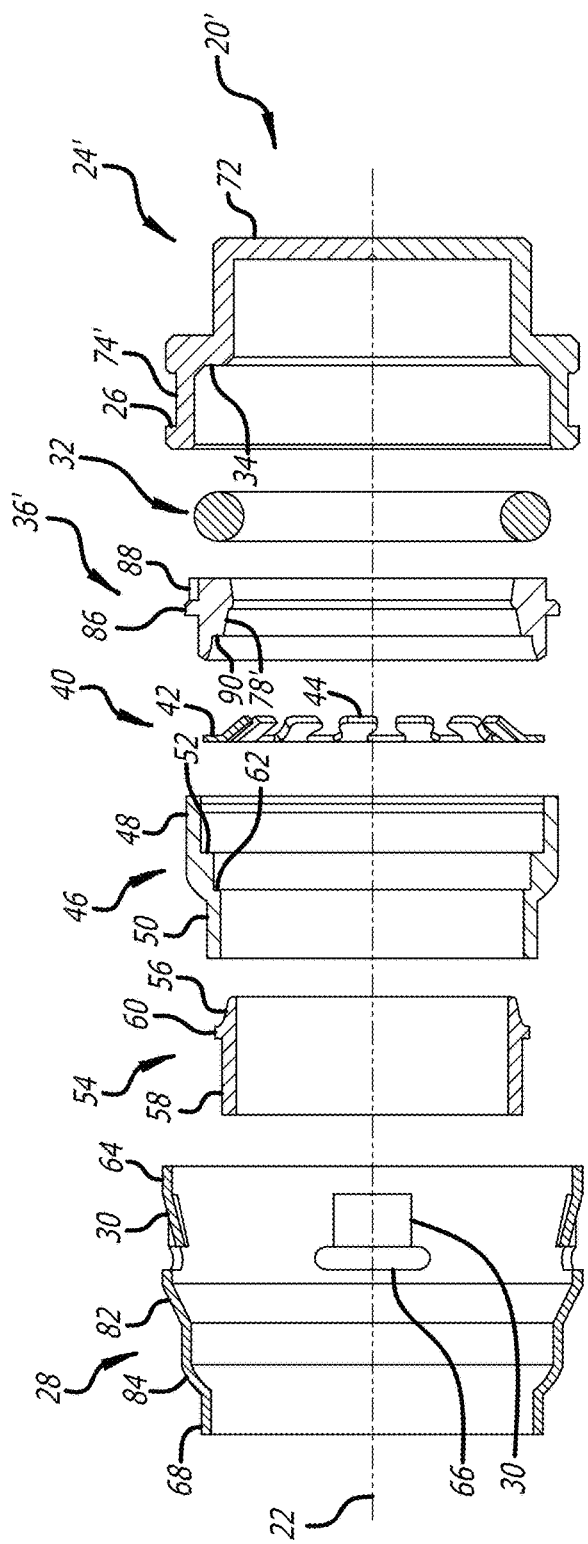

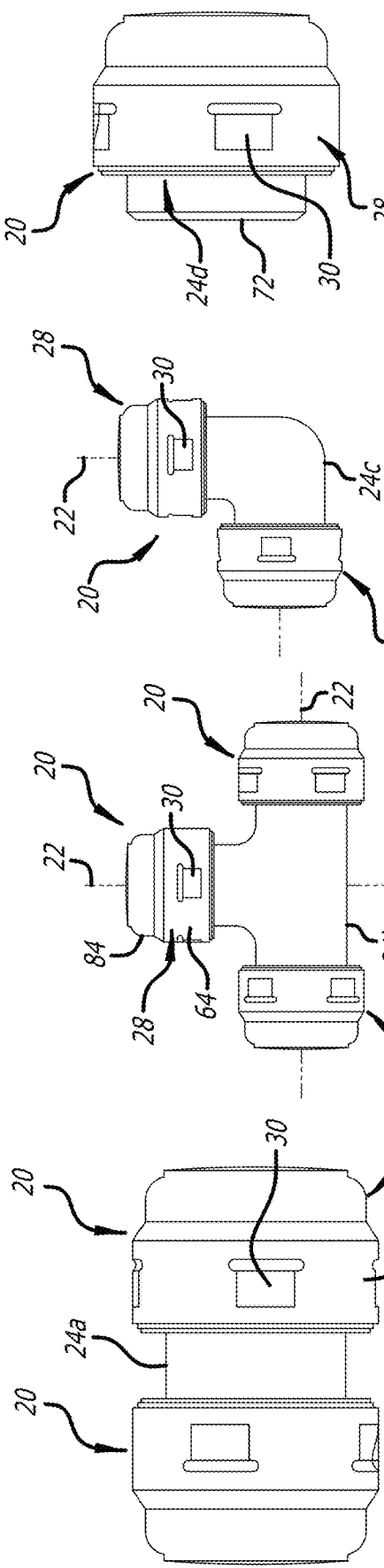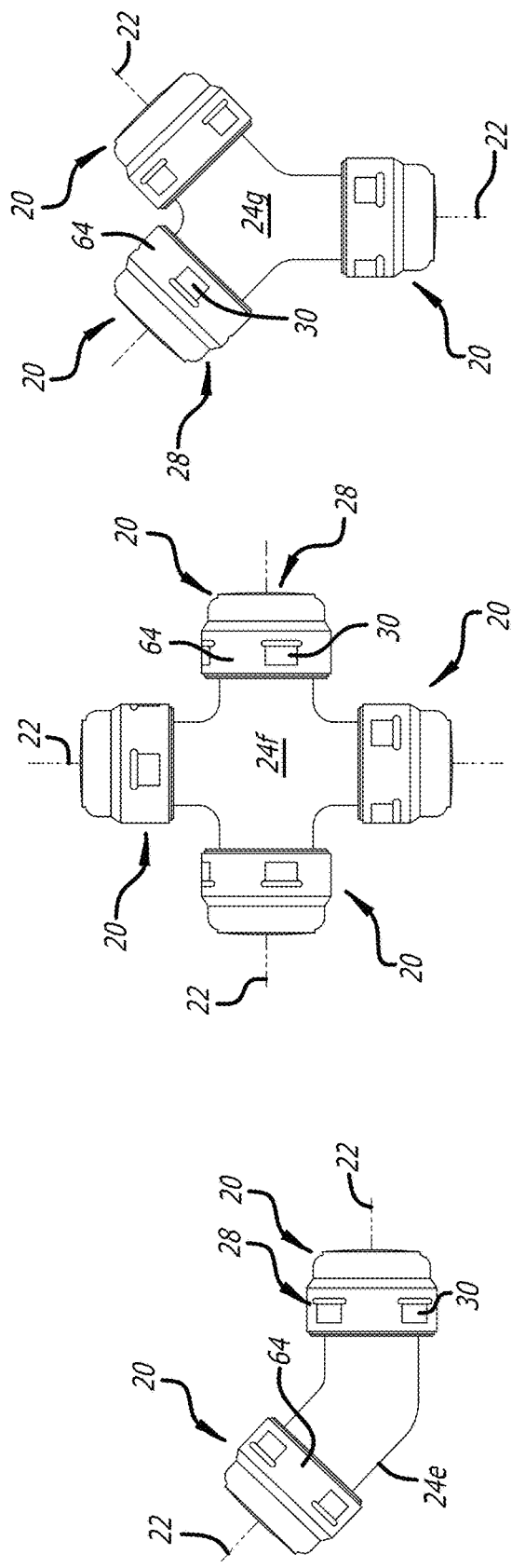

TUBULAR CONNECTOR

CROSS-REFERENCE TO RELATED APPLICATIONS

The present application is a continuation of U.S. patent application Ser. No. 17/932,024, filed Sep. 14, 2022; which is a continuation of U.S. patent application Ser. No. 17/048,557, filed Oct. 16, 2020, now U.S. Pat. No. 11,525,534; which is a national phase entry of International Patent Application No. PCT/US2019/025851, filed Apr. 4, 2019; which is a supplementary application to U.S. Provisional Patent Application No. 62/718,562, filed Aug. 14, 2018, the disclosures of which are herein incorporated by reference in their entireties.

STATEMENT RE: FEDERALLY SPONSORED RESEARCH/DEVELOPMENT

Not Applicable

BACKGROUND

Tubes are used to carry a variety of liquids and/or gases. Couplings or connectors are used to join the tubes in various ways so the tubes can be arranged in a myriad of possible configurations to move material through the tubes. The tubes may be stiff or rigid as with metal or plastic pipes used in household plumbing applications, or the tubes may be flexible. Connectors are used for end-to-end connection of tubes, or they can route tubes at different directions relative to the tube axis. For example, connectors can be employed to change the direction of piping, such as by 45° or 90° angle with respect to a flow passage through the pipe to which the connector is connected. Connectors can also be employed to branch or split piping in different directions. For example, a single pipe section can be connected by a T-fitting or a Y-fitting or a multi-tube joint or a change in diameter.

However, existing tube connectors may be difficult to assemble or require special tools to assemble them. For example, threaded connectors may require a wrench to hold one part while rotating a mating part. There is thus a need for a connector that does not require tools to connect a tube to a connector so the connector may be achieved manually, without tools.

Some existing connectors require deformation to join two parts or to join the connector to the tube. For example, the ends of garden hoses have an outer portion of a hose bib crimped around the outside of the tube to connect the male or female hose bib to the garden hose. Similarly, U.S. Pat. No. 9,228,681 for example, has a user manually deform an end portion of a sleeve so that two parts of a connector cannot move axially apart, thus securing the parts of the connector together. There is thus a need for a simpler connector that does not require manual deformation to join parts.

Some connectors are irreversible and may not be removed except by destroying the connector. A welded or soldered pipe joint is an historic example of a permanent connector. But there is sometimes a need to uncouple a tube and reuse the connector. There is thus a need for a connector that may be uncoupled without destroying the connector.

It is desirable that the fluid connectors not leak, as it may lead to loss of system pressure, or harmful puddles of liquids, or worse if hazardous materials are transported through the tubes. Achieving good fluid seals with fast-connecting couplings is always difficult. There is thus a continuing need for an improved connector that connects fast and provides a fluid-tight seal at least at pressures several times greater than the expected operational pressure of the tubular connector.

SUMMARY

In one aspect, the invention resides in a connector comprising:
  a connecting body having a fluid passage that extends at least part way therethrough;
  a seal configured to provide a seal with an outer portion of a fluid tube;
  a cartridge located near the connecting body, the cartridge having a hollow portion therethrough;
  a grab part having one or more teeth that are configured to retain the fluid tube, the grab part being located between the cartridge and the seal;
  a demount part being movable within the hollow portion of the cartridge and configured to move the one or more teeth to a position to allow the fluid tube to be released; and
  a sleeve covering at least part of the cartridge and the connecting body,
  wherein a latch is located on one of the sleeve or the connecting body and a mating catch is located on the other of the sleeve or the connecting body such that engagement of the latch with the catch connects the sleeve to the connecting body and assists in restraining movement of the cartridge.

In an embodiment, the latch is configured to rotate about a sidewall connected thereto in order to engage with the catch.

In an embodiment, the latch includes one or more protrusions extending from the sidewall.

In an embodiment, the latch is configured to move in a direction away from and towards the catch in order to engage the catch.

In an embodiment, the latch extends transversely from a side wall connected thereto.

In an embodiment, the latch extends in a direction of about 5 degrees transversely to the side wall.

In an embodiment, the catch is in the form of a recess or projection.

In an embodiment, the catch is located on the connecting body.

In an embodiment, engagement of the catch with the latch assists in preventing rotation of the sleeve relative to the connecting body.

In an embodiment, an external force being applied over a distance from at least the demount ring to the cartridge is unable to move the demount ring to a position that engages with the teeth to allow the fluid tube to be released.

In an embodiment, the external force is provided on a free end of the demount ring.

In an embodiment, the free end of the demount ring ends substantially in a similar plane to an end of the cartridge or the sleeve.

In an embodiment, the connector includes a protecting ring that is configured to assist in protecting the seal.

In an embodiment, the protecting ring includes a stop that assists in ensuring the seal is captured in a space where retention of the seal is suitable.

In an embodiment, the protecting ring includes a protrusion that assists in supporting the fluid tube.

In a further aspect, the invention resides in a connector comprising:
a connecting body having a fluid passage that extends at least part way therethrough;
a seal configured to provide a seal with an outer portion of a fluid tube;
a cartridge located near the connecting body, the cartridge having a hollow portion therethrough;
a grab part having one or more teeth that are configured to retain the fluid tube, the grab part being located between the cartridge and the seal;
a demount part being movable within the hollow portion of the cartridge and configured to move the one or more teeth to a position to allow the fluid tube to be released; and
a sleeve covering at least part of the cartridge and the connecting body to provide a connection therebetween,
wherein an external force being applied over a distance from at least a free end of the demount ring to the cartridge is unable to move the demount ring to a position that engages with the teeth to allow the fluid tube to be released.

In an embodiment, the connector is as herein described.

In a further aspect, the invention resides in a connector assembly comprising:
a connecting body having a fluid passage that extends at least part way therethrough;
a first connector as herein described using the connecting body; and
a second connector as herein described using the connecting body To further elaborate the aspect above, the invention resides in a connector assembly comprising:
a connecting body having a fluid passage that extends at least part way therethrough;
a first connector comprising:
a first seal configured to provide a seal with an outer portion of a first fluid tube;
a first cartridge located near the connecting body, the first cartridge having a hollow portion therethrough;
a first grab part having one or more teeth that are configured to retain the first fluid tube, the first grab part being located between the first cartridge and the first seal;
a first demount part being movable within the hollow portion of the first cartridge and configured to move the one or more teeth of the first grab part to a position to allow the first fluid tube to be released; and
a first sleeve covering at least part of the first cartridge and the connecting body; and
a second connector comprising:
a second seal configured to provide a seal with an outer portion of a second fluid tube;
a second cartridge located near the connecting body, the second cartridge having a hollow portion therethrough;
a second grab part having one or more teeth that are configured to retain the second fluid tube, the second grab part being located between the second cartridge and the second seal;
a second demount part being movable within the hollow portion of the second cartridge and configured to move the one or more teeth to a position to allow the second fluid tube to be released; and
a second sleeve covering at least part of the second cartridge and the connecting body,
wherein a first latch is located on one of the first sleeve or the connecting body and a first mating catch is located on the other of the first sleeve or the connecting body such that engagement of the first latch with the first catch connects the first sleeve to the connecting body and assists in restraining movement of the first cartridge.

In an embodiment, a second latch is located on one of the second sleeve or the connecting body and a second mating catch is located on the other of the second sleeve or the connecting body such that engagement of the second latch with the second catch connects the second sleeve to the connecting body and assists in restraining movement of the second cartridge.

In another aspect, an exemplary embodiment resides in a tubular connector having an annular connecting body at a distal end of the connector, and a tubular sleeve at a proximal end of the connector and extends along a longitudinal axis. The connecting body has an outwardly extending flange adjacent a recess so the flange forms a catch that preferably extends around a circumference of the connecting body. The connecting body has an internal shoulder encircling the longitudinal axis and toward which a sealing ring is urged by an annular protecting ring, a portion of which fits inside the connecting body and also encircles the longitudinal axis. A grab ring having an annular base with teeth extending distally toward the connecting body and inward toward the longitudinal axis is contained in a cartridge part that pushes the grab ring and protecting ring against the sealing ring and the connecting body. A demount ring with a tapered distal end nests with the inclined teeth on the grab ring to either support the teeth or limit movement of the teeth in a first position, and to move the teeth out of engagement with a tube in a second, demount position. The demount ring rests against an internal shoulder on the cartridge part with a proximal end passing through the cartridge part but ending flush with the sleeve. The sleeve has several latch members extending inward toward the longitudinal axis and away from the connecting body. The latch members are spread apart by the connecting body's flange and located to move inward and engage the catch on the connecting body to connect the sealing ring, protecting ring, grab ring, cartridge part and demount ring together inside of and between the sleeve and connecting body to form a connector.

A tube is inserted through the proximal end of the sleeve, through the inside of the demount ring and cartridge part. The tube spreads the teeth of the grab ring as it passes the grab ring and passes through the sealing ring until a distal end of the tube hits a stop in the connecting body. Because the grab ring teeth were spread apart by the tube the teeth are resiliently urged against the outer surface of tube and the teeth are inclined in a direction to resist removal of the tube from the grab ring and connector. The sealing ring provides a fluid seal around an outer circumference of the tube, and the protecting ring aligning the sealing ring for use and protecting the sealing ring from damage by the teeth of the grab ring. The connecting body may be part of a fluid fitting, or configured to connect to a fitting or configured to connect to another tube. The demount ring may be moved toward the connecting body and grab ring teeth to spread the teeth apart and disengage them from the tube to allow removal of the tube from the connector.

There is thus advantageously provided a connector for a fluid tube having an outer diameter D where the connector has proximal and distal ends and extends along a longitudinal axis. The connector may include a connector body having a fluid passage extending at least part way through the body and a tube stop to limit passage of the fluid tube through the connector body during use. The assembly may further include a sealing ring encircling the longitudinal axis and having an internal diameter to provide a fluid tight seal with the fluid tube when the fluid tube passes through the sealing ring during use. The assembly may further include a protecting ring encircling the longitudinal axis with the sealing ring located between a shoulder on the connector body and the protecting ring. The assembly may also include a cartridge part encircling the longitudinal axis and holding the protecting ring against the connector body. The assembly may include a grab ring having a plurality of teeth encircling the longitudinal axis and extending inward and toward the connector body a distance sufficient to grab the fluid tube during use. The grab ring is held between the cartridge part and the protecting ring. A demount ring advantageously encircles the longitudinal axis and is held between a shoulder on the cartridge part and the grab ring. The demount ring is axially movable a distance sufficient to push the teeth outward and release the fluid tube. The assembly also has a tubular sleeve encircling the cartridge part and protecting ring and part of the connecting body. The sleeve is latched to the connecting body and holds the cartridge part against the protecting ring and holds the protecting ring against the connecting body. The sleeve has a proximal end with a sleeve opening through which the fluid tube passes during use.

In other variations, the demount ring has a demount tube extending through the sleeve opening and the cartridge part has a cartridge tube encircling the demount tube and also extending through the sleeve opening, with the demount tube being larger than the tube diameter D so the fluid tube passes through the demount tube. In still further variations, the sealing ring may move axially a distance of about 2-5 mm between the protecting ring and the shoulder on the connecting body. The assembly may include the fluid tube passing through the sleeve opening and grab ring teeth and sealing ring. In a further embodiment, the fluid tube contacts the fluid tube stop in the connecting body and the fluid passage extends all the way through the connector body. The connecting body advantageously includes one or more of a straight-line connector, a T connector, a Y-connector, an elbow connector, or a connector changing diameter, or a blind end.

In an embodiment, there is also advantageously provided a connector for a fluid tube having an outer diameter D, where the connector has proximal and distal ends and extending along a longitudinal axis. The connector includes a connecting body having an annular proximal end with an internal cylindrical recess extending along the longitudinal axis and a fluid passage that extends at least part way through the connecting body. The connecting body has an inwardly extending shoulder and a tube stop also extending inward. The connecting body also has a distal end. A sealing ring is located in the internal cylindrical recess adjacent the inwardly extending shoulder of the connecting body. The sealing ring has a circular inner diameter sufficiently smaller than D to form a fluid seal with the outer diameter of the tube during use. The assembly further has an annular protecting ring encircling and centered on the longitudinal axis and having at least a portion of the protecting ring inside the cylindrical recess to trap the sealing ring between the inwardly extending shoulder and the protecting ring. Further, an annular cartridge part encircles and is centered on the longitudinal axis. The cartridge part has a distal end contacting the connecting body and advantageously has first and second annular shoulders encircling the longitudinal axis and having a tubular proximal end. The assembly further includes an annular grab ring encircling and centered on the longitudinal axis and having a plurality of teeth with distal ends of the teeth encircling the longitudinal axis at a diameter smaller than D. The grab ring teeth are inclined inward toward the longitudinal axis and toward the proximal end of the assembly. The grab ring has a base held axially between the first annular shoulder on the cartridge part and the protecting ring. The protecting ring is interposed between the grab ring and the sealing ring to prevent the grab ring teeth from damaging the sealing ring. The assembly also has a demount ring encircling and centered on the longitudinal axis and having an inclined surface inclined inward and toward the distal end of the assembly. The demount ring is movable between a first position contacting the second annular shoulder on the cartridge part and a second position contacting the grab ring teeth and urging the teeth outward a distance greater than D. The assembly also has a tubular sleeve on the proximal end of the connector. The sleeve has a sleeve sidewall encircling and centered on the longitudinal axis, with a proximal end having an opening larger than D. The sleeve sidewall encloses the grab ring, cartridge part, demount ring, protecting ring and a portion of the connecting body. A latch on one of the sleeve or connecting body and a mating catch on the other of the sleeve or connecting body to restrain axial movement of the sleeve and connecting body relative to each other.

Any or all of the connectors or connector assemblies may have the following variations, including locating the catch on the sleeve sidewall and locating the latch on the connector body. The sealing ring can advantageously move about 2-5 mm along the cylindrical recess between the protecting ring and the inwardly extending shoulder on the connecting body. The protecting ring preferably has an axial length sufficient to prevent the grab ring teeth from contacting the sealing ring, and may further have an inclined surface which is inclined inward toward the longitudinal axis and toward the distal end of the connector to protect the sealing ring from the grab ring teeth. The demount ring may have a cylindrical demount tube on its proximal end extending along the longitudinal axis and having an inner diameter about the same as but slightly larger than D so the tube can pass through the demount tube during use. The tube on the proximal end of the cartridge part may encircle the cylindrical demount tube and extend in the proximal direction about the same distance as or slightly greater than the cylindrical demount tube. Advantageously, the proximal ends of the cylindrical tubes end in substantially the same plane orthogonal to the longitudinal axis. Advantageously, the proximal end of the cylindrical demount tube ends distal of the proximal end of the tube on the cartridge part. The proximal end of the sleeve may include a rounded outer surface and/or an inclined surface extending around the circumference of the sleeve end-mostly to strengthen the sleeve's end.

Any or all of the connectors or connector assemblies may also have the following variations. The connecting body may comprise one of a straight-line connector, a T connector, a Y-connector, an elbow connector, a blind end connector, or a connector changing diameter. The connecting body advantageously has a fluid passage extending all the way through the connecting body. Moreover, the connector advantageously includes the fluid tube and has the grab ring engaging an outer surface of the fluid tube to restrain removal of the fluid tube from the connector, with the sealing ring providing a fluid tight connection around a circumference of the fluid tube.

In a further embodiment, there is also provided a kit for connecting two fluid tubes. The kit may include any of the connector assemblies described herein along with at least one tube having an outer diameter D at one end of the tube for connection with one of the connector. Advantageously, there are a plurality of connector assemblies and a plurality of tubes. The kit advantageously has connector assemblies in which the sealing ring can move about 2-5 mm along the cylindrical recess between the protecting ring and the inwardly extending shoulder on the connecting body. The kit advantageously includes a connecting body that comprises one of a straight-line connector, a T connector, a Y-connector, an elbow connector, a blind end connector, or a connector changing diameter. The kit advantageously has a demount ring with a cylindrical demount tube on its proximal end that extends along the longitudinal axis and has an inner diameter about the same as but slightly larger than D so the tube can fit snugly inside the cylindrical demount tube. The kit also advantageously has the tubular proximal end of the cartridge encircling the cylindrical demount tube, with the proximal end of the demount tube not extending beyond the proximal end of the cylindrical tube on the cartridge part.

BRIEF DESCRIPTION OF THE DRAWINGS

By way of example only, other embodiments of the invention will be described more fully hereinafter with reference to the accompanying figures, in which like numbers refer to like parts throughout, wherein:

FIG. 1 is an exploded sectional view of a connector using a blind connector taken along section 1-1 of FIG. 4, according to an embodiment of the invention;

FIG. 2 is a side view of the parts of FIG. 1 combined to form a connector, with the opposing side views, top view and bottom view being substantially the same;

FIG. 3 is a right-side view of the connector of FIG. 2:

FIG. 4 is a left-side view of the connector of FIG. 2;

FIG. 5 is a side view of the connector of FIG. 2 with a fluid tube connected to the connector;

FIG. 6 is a sectional view of the connector and fluid tube of FIG. 5;

FIG. 7 is a side view of a connector with an unspecified connecting body instead of the blind connector of FIG. 2;

FIG. 8 is a sectional view of the connector of FIG. 7;

FIG. 11 is an exploded cross-sectional view of the connector of FIG. 2 with some parts specially modified to be made of metal, according to a further embodiment of the invention;

FIG. 12 is a sectional view of the parts of FIG. 11 assembled to form a connector with a blind connecting body;

FIG. 13A is a side view of a connector assembly using components of the connector in FIG. 2 to form a coupling fitting, according to an embodiment of the invention;

FIG. 13B is a side view of a connector assembly using components of the connector in FIG. 2 to form a T-fitting, according to an embodiment of the invention;

FIG. 13C is a side view of a connector assembly using components of the connector in FIG. 2 to form an elbow fitting, according to an embodiment of the invention;

FIG. 13D is a side view of a connector assembly using components of the connector in FIG. 2 to form a blind fitting or dead-end fitting, according to an embodiment of the invention;

FIG. 13E is a side view of a connector assembly using components of the connector in FIG. 2 to form an angle fitting, according to an embodiment of the invention;

FIG. 13F is a side view of a connector assembly using components of the connector in FIG. 2 to form a 4-way fitting, according to an embodiment of the invention;

FIG. 13G is a side view of a connector assembly using components of the connector in FIG. 2 to form a Y-fitting;

DETAILED DESCRIPTION

Figure 9:
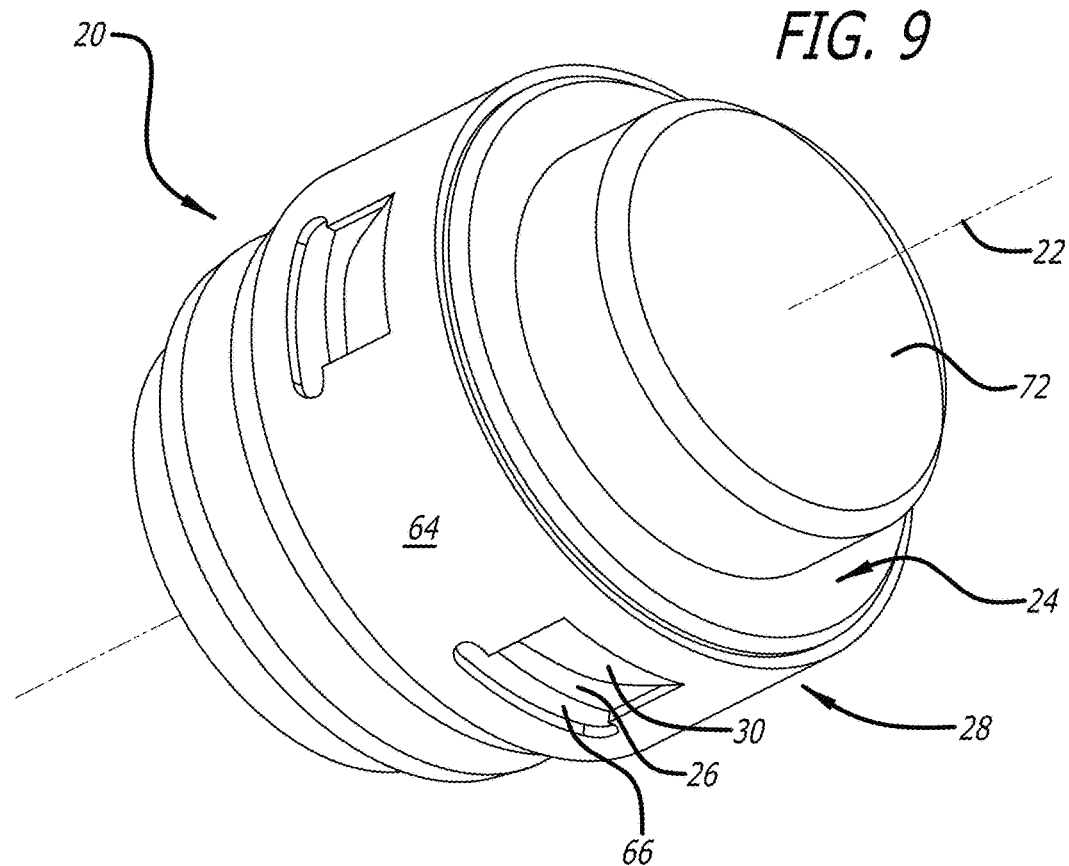
FIG. 9 is a perspective view of the connector of FIG. 2, showing the connecting body.
Figure 10:
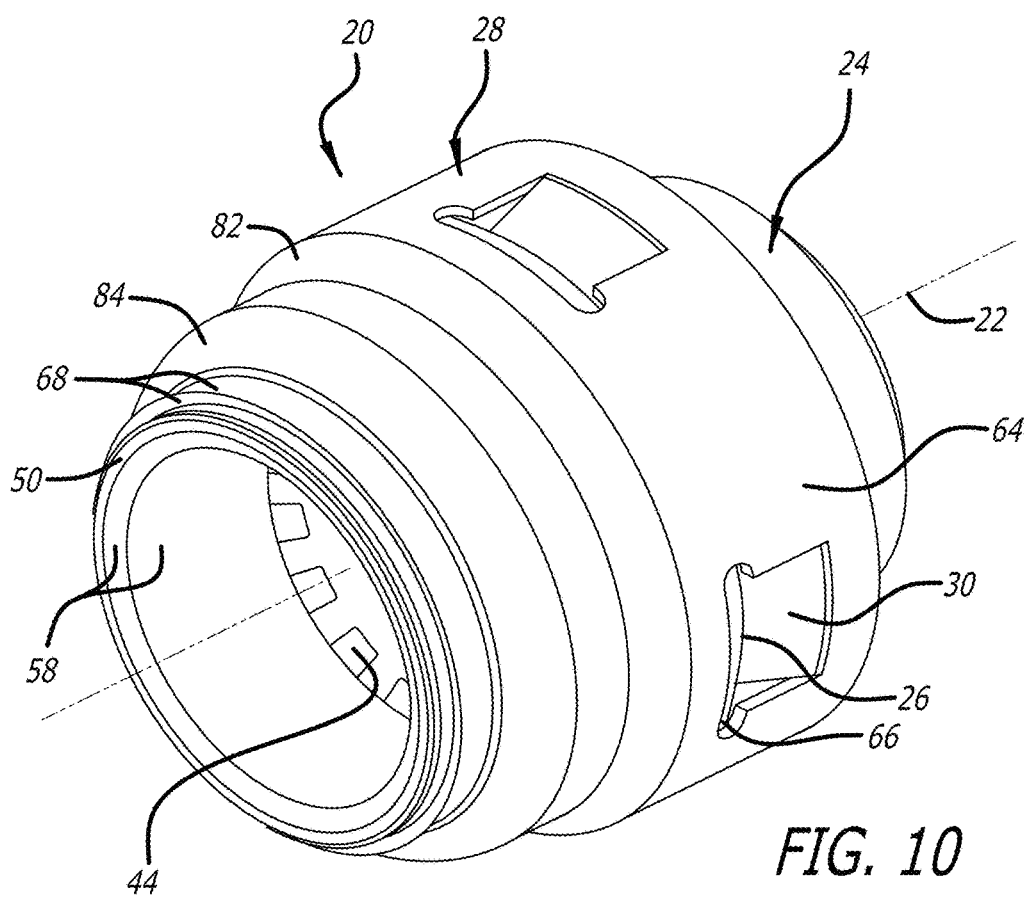
FIG. 10 is a perspective view of the connector of FIG. 2, showing the sleeve opening of the connector.

As used herein, the relative directions and terms inward and outward are with respect to the longitudinal axis, with inward being toward the longitudinal axis and outward being away from that axis. The relative directions and terms distal and proximal are with respect to a connector fastened to an end of a tube, with the distal direction being toward the end of the connector on the end of the tube, and the proximal direction being toward the beginning of the tube segment to which the connector is fastened. The relative direction and term lateral or laterally are in a plane generally orthogonal to the longitudinal axis.

FIGS. 1-4 illustrate a connector 20 extending along a longitudinal axis 22. The connector 20 includes an annular connecting body 24, a sleeve 28, a seal in the form of sealing ring 32, a protecting part in the form of protecting ring 36, a grab part in the form of grab ring 40, a cartridge in the form of cartridge part 46 and a demount part in the form of demount ring 54. In some embodiments, the cartridge part 46 may be configured as a cartridge ring.

By way of a brief summary, the connecting body 24 includes a catch 26 at a distal end of the connector 20. The catch 26 is in the form of a groove that extends radially around the connecting body 24. The sleeve 28 has at least one and, in this embodiment, four latches 30 extending inwardly at a proximal end of the connector 20. The latches 30 engage the catch 26 to connect the sleeve 28 to the connecting body 24.

The connector 20 has other parts, as outlined above and in further detail below, held between and preferably contained within the connecting body 24 and sleeve 28. For instance, the sealing ring 32 is urged towards or rests against an internal shoulder 34 of the connecting body 20 by the protecting ring 34 having an inwardly stepped distal end 36 contacting the sealing ring 32. The grab ring 40 has an annular base 42 with a plurality of protrusions in the form of teeth 44 extending inward and distally toward the connecting body 24. The cartridge part 46 has a tubular wall 48 on its distal end and a smaller diameter proximal end 50. The tubular wall 48 fits into a recess in the connecting body 24 having an annular, internal shoulder 52 that limits the motion along the axis in the longitudinal direction. The tubular wall 48 extends along the longitudinal axis 22 and encloses the sealing ring 32, the protecting ring 36 and the grab ring 40.

The demount ring 54 is also located within the sleeve 28 and it has a tubular proximal (free) end 58 passing through the proximal end 50 of the cartridge part 46 as it extends along the longitudinal axis 22. The (free) end 58 has no externally extending part connected thereto. A stop flange 60 is between the distal end surface 56 and the proximal tubular end 58 and contacts an internal stop 62 on the cartridge part 46, preferably formed by an internal shoulder on the cartridge part 46. The demount ring 54 has a distal end advantageously taking the form of an outwardly facing surface 56 inclined toward the longitudinal axis and inclined toward the connecting body 22 and configured to generally conform to the conical shape formed by the inclined grab ring teeth 44. The teeth 44 are likewise inclined toward the sealing ring 32.

To further elaborate on the components above, the connecting body 24 may be of metal (e.g., brass, stainless steel) or plastic suitable for the intended use, such as polyethylene or PPR or UHMWP. The fluid transported by the tubes 70 and pressures will determine the suitable material for the tubes and for the connector body 24. In FIGS. 1-6, the connecting body 24 is shown as a blind connector which has end wall 72 closing off the fluid path through the connecting body 24 and from the tube 70 connected to that connecting body. The end wall 72 forms a tube stop which limits movement of the tube 70 through the connecting body 24.

However, to form other connector assemblies required in industry, the connecting body may be a straight-line connecting body 24a or coupler (FIG. 13A), a T connecting body 24b (FIG. 13B), an elbow connecting body 24c (FIG. 13C), a blind end connecting 24c? (FIG. 13D) which blocks flow through the pipe (similar to connecting body 24), a connector changing diameter of the connected pipes (not shown), an angle connecting body 24e (FIG. 13E), a multi-line (or 4-way) connecting body 24f (FIG. 13F), a wye (Y) connecting body 24g (FIG. 13G), a tee-wye connector (not shown), or another type of connector or combinations of connectors. Naturally, the connecting bodies 24a-24g may have a similar or the same catching arrangement to the catch 26.

The various connector assemblies shown in FIGS. 13A-13G may have one or more parts of the connector 20 described above, and the description of those parts is not repeated although some of the part numbers are shown in the figures. In particular, it will be appreciated that the connecting bodies 24a-24g may be used instead of the connecting body 24 whilst the remaining parts of the connector 20 (i.e. the sleeve 28, the sealing ring 32, the protecting ring 36, the grab ring 40, the cartridge part 46 and the demount ring 54) are used to create the respective connectors. As can be seen in FIGS. 13A-13G, multiple connectors are respectively used on each end of the connecting bodies 24a-24g to form the connector assemblies. If the fluid passage extends through the connecting body 24a-24c, 24c-24g, then a tube stop may take the form of an internal shoulder on the connecting body 24a-24c, 24e-24g encircling the flow passage, and preferably forming an annular surface.

As seen in FIGS. 1 and 2, the proximal end of the connecting body 24 is slightly chamfered so it may resiliently urge the resilient laches 30 outward as the sleeve 28 and connecting body 24 are moved relative to each other until the latch 30 engages the catch 26. It will be appreciated that the same feature may be included on any one of the connecting bodies 24a-24g. An inclined exterior shoulder 74 adjacent the catch 26 may optionally be provided with the shoulder inclined inward and toward the proximal end so as to be aligned with the latch 30. The shoulder 74 may prevent the latch 30 from being bent inward and may strengthen the latch-catch connection to better resist separation along the longitudinal axis 22.

The sleeve 28 has a sleeve sidewall 64 from which the latches 30 extend. The latches 30 comprise a resiliently flexible protrusion. The latches 30 extends away from the sleeve sidewall 62 towards the axis 22. That is, in this embodiment, the latches 30 are in the form of tabs and have an opening 66 at the proximal end of each tab. In this regard, the latch 30 may comprise an elongated member resiliently urged in a direction to engage the catch 26. Accordingly, the latch 30 extends transversely to the axis 22 in order to suitably engage with the catch 26.

The depicted latch 30 is shown as a generally rectangular plate cut into the sidewall 64 of the sleeve 28 and bent inward toward the longitudinal axis 22. The opening 66 in the sidewall defines an end of the latch 30 (before it is bent inward) and two parallel cuts aligned with axis 22 extend to the opening 66 to define the remaining two sides of the generally rectangular plate forming the latch. As the sidewall 64 is curved, the free end of the latch 30 is slightly curved, advantageously at the same general curvature as the radially outward extending flange forming the catch 26. The latches 30 typically extend at an angle of approximately 5 degrees transversely to the axis 22 when captured by the catch 26. This assists with achieving a higher burst pressure as the latches 30 are less likely to fail. Separately, the sleeve 28 has an axially aligned opening 68 in its proximal end sized to allow passage of a first fluid tube 70, with the opening advantageously defined by a cylindrical tube.

The sealing ring 32 is made of resilient material such as rubber, EPDM or other suitable elastomers. The sealing ring 32 is shown as an O-ring with a circular cross-section but may have various cross-sectional shapes. The inner and outer diameter of the sealing ring 32 are selected to fit into and seal against the connecting body 24 and to form a fluid tight seal with the tube 70 passing through the inner diameter of the sealing ring 32. Advantageously, the internal shoulder 34 of the connecting body 24 is configured to seal against the sealing ring 32, and in the depicted embodiment the internal shoulder 34 is shown as having a curved corner between the axial and radial portions of the shoulder 34 which curve is selected to conform to shape and size of the cross-section of the sealing ring 32.

The protecting ring 36 has its distal end 38 (i.e., one end) configured to fit inside the proximal end of the connecting body 24 to trap the sealing ring 32 between the shoulder 34 and the protecting ring 36. The sealing ring 32 is advantageously allowed axial motion, preferably about 2-5 mm motion along longitudinal axis 22. Thus, the sealing ring 32 may advantageously move about 2-5 mm along the longitudinal axis 22 between the protecting ring 36 and the shoulder 34 of the connecting body. The protecting ring's distal end 38 is preferably cylindrical as is the larger diameter, outer body of the annular, protecting ring 36, so as to form an annular, radially inward extending shoulder acting as stop 76 that contacts the annular, proximal end of the connecting body 24 to limit the relative positions of the protecting ring 36 and connecting body 24 along the longitudinal axis 22. The shoulder or stop 76 also centers the protecting ring 36 within the connecting body 24 and by locating the distal end 38 of the protecting ring 36 relative to the stop 76 on the protective ring 36, it allows that distal end 38 to extend a predetermined distance into the (cylindrical) recess that extends from the connecting body's shoulder 34 to the proximal end of the connecting body 24 and thereby determine the preferred 2-5 mm axial movement of the sealing ring 32 within that (cylindrical) recess. In other words, the protecting ring 36 includes a projection 39 extending away from the stop 76 that assists in locating it in the fluid passage extending through the connecting body 24. The extension of projection 39 through at least part of the connecting body 24 assists in fluid tube support and achieving higher pressure ratings. Furthermore, the stop 76 prevents a tolerance stack up that may affect the location of the sealing ring 32 and its subsequent sealing. Accordingly, the projection 39 assists in assembly as calibration requirements may be reduced. Separately, the stop 76 extends radially outward only a short distance and less than a radial thickness of the proximal end of the connecting body 24.

The protecting ring 36 advantageously has an inclined surface 78 inclined inward and toward the distal end of the connector 20, so as to generally align with the teeth 44 of the grab ring 40. The inclined surface 78 forms a generally conical surface. The axial length of the protecting ring 36 and the inclined surface 78 prevent the teeth 44 from contacting and damaging the sealing ring 32.

The annular grab ring 40 is preferably of metal with a flat, radially extending base 42, and inclined teeth 44 encircling the longitudinal axis 22. The teeth 44 are equally spaced and sufficient in number to resiliently engage the outer surface of the tube 70 and restrain it from being removed along the axis 22. The grab ring 40 is held between the cartridge part 46 and the protecting ring 36. Advantageously, a proximal end of the protecting ring 36 contacts the distal side of the base 42, while internal shoulder 52 on the cartridge part 46 contacts the proximal side of the base 42. As the teeth 44 flex outward when the tube 70 passes through the opening formed by the teeth 44, the teeth 44 bend toward the generally conical surface 78 on the protecting ring 36. One or all of the inner diameters of the protecting ring 36 and the relative angles of the teeth 44 and surface 78 and the inner diameter of tubular proximal end 58 of the demount ring 54, may limit the maximum diameter of the tube 70 inserted through the grab ring 40 and protecting ring 36.

As outlined above, the cartridge part 46 has a second internal shoulder forming stop 62 inward of the shoulder 52. The shoulder 52 forms an axially aligned face against which the stop flange 60 on the demount ring 54 rests to limit axial motion of the demount ring 54 relative to the cartridge part 46 in one axial direction. The tubular proximal end 58 of the demount ring 54 is inserted from the distal end of the cartridge part 46 until the stop flange 60 contacts the radially extending, annular shoulder 62 on the cartridge part 46. Thus, the cartridge part 46 limits motion along the longitudinal axis 22 (in the proximal direction) of the demount ring 54 and/or the grab ring 40. The demount ring 54 can move in the distal direction along axis 22 and can spread the grab ring teeth 44 outward to disengage those teeth from the tube 70 previously engaged by those teeth 44. Thus, pushing in the distal direction on the proximal end of the demount ring 54 may disengage the grab ring teeth 44 from the tube 70 and allow removal of the tube 70 from the connector 20.

The demount ring 54 is positioned on the cartridge part 46 to move therealong. The inclined surface 56 of the demount ring 54 is on a proximal side of the grab ring teeth 44, while the inclined surface 78 on the protecting ring 36 is on the distal side of the grab ring teeth 44. The grab ring teeth 44 are between the inclined surfaces 56 and 78. Advantageously, the inclined surface 56 on the demount ring 54 is configured to engage the base of the teeth 40 adjacent the grab ring's base 42.

To further detail the construction of the connector 20, the protecting ring 36 advantageously has an engaging member on its outer surface mating with another engaging part on the cartridge part 54. The depicted construction has an engaging member in the form of a slight outward protrusion 77, preferably a slightly raised, circumferential ring with inclined leading and/or trailing edges. The protrusion 77 is located and configured to fit into an engaging part in the form of a circumferential recess 79 on the inside of the tubular wall 48 of the cartridge part 46. Advantageously, when the protrusion 77 on the protecting ring 36 engages the recess 79 on the cartridge part 46, the two parts are held together so as to secure the grab ring 40 between the shoulder 52 on the cartridge part and the proximal end of the protecting ring. Moreover, the demount ring 54 is preferably already seated with its stop 60 on the stop 62 of the cartridge part 46 so the snap connection of the protrusion and recess 77, 79 also restrains the demount ring 54 from moving out of the cartridge part 46. The demount ring 54 can move axially between the shoulder 62 and the grab ring 40. The cartridge part 46 and protecting ring 36 may thus form a snap-fit sub assembly restraining movement of the demount ring 54 and grab ring 40, so all those parts may move as a unit.

The cartridge part 46 has the diameter of its tubular wall 48 selected so that it contacts the connecting body 24. When the cartridge part 46 contacts the connecting body 24, the grab ring 40 is trapped between the protecting ring 36 and the internal shoulder 52 on the cartridge part 46, with the demount ring 54 located so its inclined surface 56 does not urge the grab ring teeth 44 outward and away from the longitudinal axis 22. Advantageously, the protecting ring 36 extends into the connecting body 24 and, as outlined above, allows the sealing ring 32 to move axially about 2-5 mm before contacting the protecting ring or the shoulder 34 on the connecting body 24. The axial motion of the sealing ring 32 is insufficient to allow the sealing ring 32 to skew or tilt enough to become misaligned when the distal end of the tube 70 contacts the sealing ring 32.

With the above in mind, the sleeve 28 has opening 68 in its proximal end sized to allow the proximal end 50 of the cartridge part 46 to pass. Advantageously, the fit is snug so the sleeve 28 radially supports the proximal end 50 of the cartridge part 46, which in turn supports the proximal end 58 of the demount ring 54, which supports the tube 70 passing through the demount ring 54. The proximal end of the sleeve 28 is shown with an inwardly inclined surface 82 and a rounded reduction in diameter 84 at its proximal end. These contours increase the radial and axial stiffness of the sleeve 28, and allow a suitable length of the parts contained within the sleeve 28. By way of example, the proximal end of the sleeve 28 includes a straight portion next to the rounded reduction 84 that suitably increases the strength of the retainer and stops unrolling of the sleeve 28. The outer periphery of the sleeve 28 preferably conforms to the outer shape of the parts inside the sleeve 28, including the portion of the connecting body 24 enclosed by the sleeve 28. Advantageously, as seen in FIG. 2, the distal end of the sleeve 28 overlaps a portion of the connecting body. The remainder of the connecting body 24 will vary, as outlined above, depending on whether the connecting body 28 is an in-line connector, an elbow connector, a T-connector, a Y-connector, a multi-tube connector, or a blind end connector as depicted in FIG. 2, or another type of connector.

For case of reference, it is also noted that the connecting body 24 may be made of metal or suitable plastic compatible with the fluid being carried by the tube 70. By way of example, a connecting body 24 made of a modified PPSU (polyphenylsulfone) may be suitable, with one such PPSU sold under the trademark Acudel®. PPSU or PSU (polysulfone) may also be suitable. The scaling ring 32 is advantageously made of rubber or suitable elastomer. For example, a scaling ring 32 of EPDM (Ethylene-Propylene-Diene-Monomer) may be suitable. The protecting ring 36 can be made of a suitable plastic, with Nylon a possible option. The grab ring 40 in this embodiment is made from stainless steel. The cartridge part 46 is made of a suitable strong polymer compatible with the fluid carried in the tube

70. A cartridge part 46 made of POM (polyoxymethylene) is potentially suitable. A demount ring 54 made of the same POM material is also believed suitable. The sleeve 28 is advantageously of stainless steel, and advantageously drawn to shape by successive drawing steps with the opening 66 and latches 30 punched in the later drawing stages.

For assembly, the demount ring 54 and grab ring 40 are contained between the cartridge part 46 and protecting ring 36 by the protrusion and recess 77, 79, described above to form a sub-assembly. Separately, the sealing ring 32 is placed into the connecting body 24 and the above-described sub-assembly is then inserted into the connecting body 24 so the distal end of the protecting ring 36 enters the cylindrical recess of the connecting body 24 until the stop 76 contacts the proximal end of the connecting body 24, trapping the sealing ring 32 between the shoulder 34 of the connecting body 24 and the distal end 38 of the protecting ring 36. Following this, the sidewall 64 of the sleeve 28 is passed over the intervening parts and the proximal end of the connecting body 24, until the sleeve latch 30 engages catch 26 to lock the sleeve 28 to the connecting body 24 and form the connector 20. For the latch 30 to engage the catch 26, the latch rotates in a first direction, as the sleeve 28 moves relative to the connecting body 24, and then returns in an opposite direction to be retained by the catch 26. Whilst being retained by the catch 26, the latch 30 extends in a transverse direction to the axis 22. The connector 20 may be provided as a separate, assembled part, or it may be provided in an unassembled state.

In a further embodiment, it would be appreciated that, for example, the sleeve 28, the protection ring 36, the grab ring 40, the cartridge part 46 and the demount ring 54 may form a subassembly during production. This subassembly may then be compressed onto the connecting body 24 with the sealing ring 32 therein. With this in mind, during production of the connector 20 according to an embodiment of the invention, the latch 30 may require the above subassemblies to be compressed to allow it to engage with the catch 26. That is, one or more of the internal components of the subassemblies need to be compressed to a point that allows the latch 30 to engage with the catch 26. After the compression force is released, one or more internal components of the subassemblies would then assist in applying a tension force on the sleeve 28. This tension force would then lock the latch 30 against the catch 26, substantially preventing rotation of the sleeve 28 about the axis 22. The engagement of the latch 30 with the catch 26 in this regard also assists in providing the forces necessary to sustain the integrity of the connector 20 when a (high pressure) fluid passes therethrough.

In addition, in other embodiments, the assembly of the connector 20 may include a tube liner that is retained within the connector 20. The tube liner assists in supporting the inner wall of the tube 70. In this regard, the tube liner would be located inboard of the demount ring 54 and configured to receive the tube 70 thereover.

After assembly of the connector 20, the tube 70 may then be inserted through the open end of the connector 20. The tube 70 is inserted through the sleeve 28, demount ring 54 and encircling tubular wall 48 of the cartridge part 46 until the distal end of the tube 70 passes through the grab ring 40, protecting ring 36 and sealing ring 32 before contacting the internal shoulder 34 which stops relative axial movement of the tube 70 through the distal end of the connector 20. The grab ring 40 and its teeth 44 prevent the tube 70 from being pulled out of the proximal end of the connector 20, while the shoulder 34 on the connecting body 24 (or 24a-24g) prevents the tube 70 from being pushed out the distal end of the connecting body 24. The outer diameter D of the tube 70 is sufficiently larger than the smaller inner diameter of the sealing ring 32 to form a fluid tight seal. Depending the amount of fluid seal or leakage that is desired or permitted, the interference fit between the sealing ring 32 and tube 47 will vary. The sealing ring 32 is advantageously allowed to slide axially in the cylindrical recess ending with shoulder 34 a distance of about 2-5 mm. However, if desired, the sealing ring 38 could be pressed against the shoulder 34 by the distal end 38 of the protecting ring 36. That is, the projection 39 may, for instance, extend to a position to compress the sealing ring 32. This may increase the integrity of the sealing by the sealing ring 32 but, as appreciated from above, needs to be traded off with a tolerance stack during assembly.

To avoid accidental disengagement of the tube 70 from the connector 20, the tubular proximal end 58 of the demount ring 54 has an axial length selected to end with the proximal end of the sleeve 28 and/or the cartridge part 46. Thus, the sleeve opening 68 and the proximal end of the demount ring 54 and its tubular proximal end 58 are in the same general plane, and the proximal end 50 of the cartridge part 46 is in that same general plane. Advantageously the demount ring 54 is slightly distal of the plane through the proximal end 58 and/or proximal end 50, by about 1 mm or less. The cartridge part 46 contacts the connecting body 24 and it is desirable to have those connected parts stationary relative to the demount ring 54 which can move axially toward the connecting body 24. To avoid accidental contact with the proximal end of the demount ring 54 from moving the demount ring 54 and reducing the gripping force of the grab ring 40 on the tube 70, it is desirable to have the proximal end of the demount ring 54 flush with or slightly distal of the proximal ends 68, 50 so the connecting body 24 or the cartridge part 46 resists axial movement cartridge part restricts axial movement of the demount ring 54 when a force is provided over at least the demount ring 54 to the cartridge part 46 or the connecting body 24. In other words, the demount ring 54 is positioned such that an external force being applied from at least the demount ring 54 to the cartridge part 46 will not allow the demount ring 54 to move to a position to disengage the teeth 44 from the tube 70. On this basis, in order to release the tube 70, the connector 20 requires a specific tool to engage the demount ring 54 alone whilst not engaging another component of the connector 20.

With the above in mind, if the connector 20 is to be removed from the tube 70, the demount ring 54 is pushed toward the distal end of the connector (with a specific tool) and towards the connecting body 24 so the inclined surface 56 on the demount ring 54 spreads the grab ring teeth 44 outward, disengaging them from the outer surface of the tube 70 and allowing the tube 70 to be removed along the axis 22. It would be apparent to a person skilled in the art, based on the present specification, that the various parts of the connector 20 encircle and prevent lateral movement of the tube 70 relative to the connector 20 and parts of that assembly, and that those parts also prevent removal of the tube 70 laterally from the connector 20.

Advantageously, the connector 20 allows parts to be arranged and snapped together for use relatively conveniently. The connector 20 does not require manual deformation of any parts to create a connection as the connector 20 need only be placed on the end of the tube 70 and either or both of the parts moved axially together in order to connect them, with the sealing ring 32 providing a fluid tight connection while the connecting body 24 (or 24a-24g)

allows the tube 70 to be used in a variety of fluid connections. If desired to disconnect the parts, the demount ring 54 may be used and pressed manually to disengage the tube, although preferably a tool is used to engage the proximal end of the demount ring 54 and move it to release the grab ring 40 and disengage the tube 70. If desired to open up the connector 20, a tool could be inserted into each opening 66 in the sleeve sidewall 64 to urge the latches 30 out of engagement with the catch 26 and thus disassemble the connector 20. Advantageously, though, the sleeve's sidewall opening 66 does not allow manual access by a user's fingers to release latch 30 from catch 26 and the use of two or more mating latches and catch(es) along with a tight fit of the sleeve 28 around the enclosed parts, makes it impractical to release the latches 30 sequentially from the catch(es) 26. Thus, disengaging the latches 30 from the catch(es) 26 is preferably not achieved without special purposed tools or requires permanently deforming at least one latch 30 or catch 26. Thus, the latch and catch 30, 26 is preferably not a releasable connection and instead requires deformation or breakage which leaves a visible record that the latches were disconnected. Preferably, the latch and catch 30, 26 form a permanent connection between the sleeve and catch body that cannot be removed without breaking the connector 20.

As outlined above, the connector 20 may be formed from one or more materials. For high strength or high-pressure applications, it is believed suitable to make all parts of suitable metal, except the sealing ring 40. The material used for the tube 70 will vary with the intended use, and may include metal pipes (e.g., copper, brass, iron), stiff plastic pipes (e.g., for plumbing), flexible tubes of plastic or flexible tubes of braided metal, braided plastic or other braided materials.

To further illustrate the above options in materials, a connector 20' having a connecting body 24' made of metal (e.g., brass) is shown in FIGS. 11-12, and in which like numbers refer to the same parts and the descriptions of such parts are not repeated. Modified parts are denoted by a prime marking (') while new parts are given new numbers. The metal connecting body 24' omits the inclined exterior shoulder 74 and instead has a uniform diameter outer surface 74'. The protecting ring 36' has a flange 86 extending radially outward from the outer surface of the annular protecting ring 36', with a plurality of axially aligned ribs 88 extending from the distal end of the flange 86 toward the distal end of the protecting ring 36'. The ribs 88 and flange 86 help center the protecting ring 36' in the cartridge part 46 on the longitudinal axis 22—while reducing the weight of the protecting ring 36'. The protecting ring 36' has a stepped inner surface to help reduce weight, with a step 90 interposed between the inclined surface 78' and the proximal end of the protecting ring 36'. cartridge part. In this variation, it is also suitable to make the sealing ring 32 from EPDM, the protecting ring 36' from Nylon, the grab ring 40 and the sleeve 28 from stainless steel, and the cartridge part 46 and demount ring 54 are made of POM.

Figure 15:
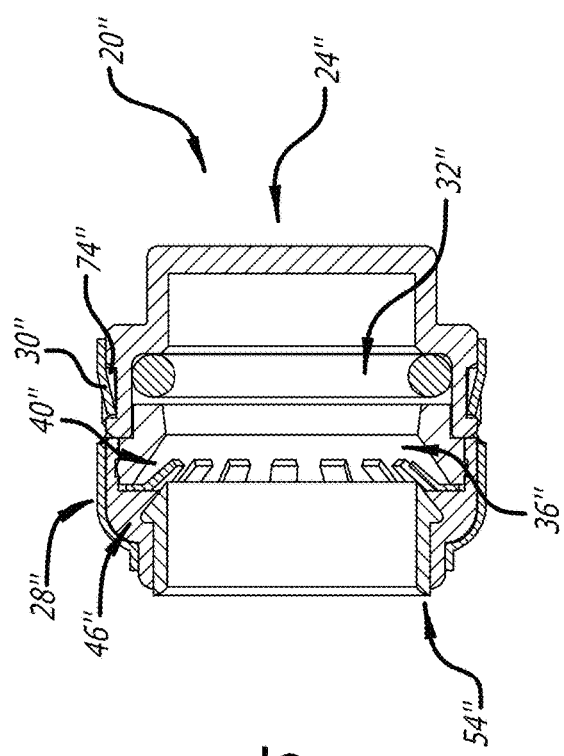
FIG. 15 is a sectional view of the parts of FIG. 14 assembled to form a connector with a blind connecting body.
Figure 14:
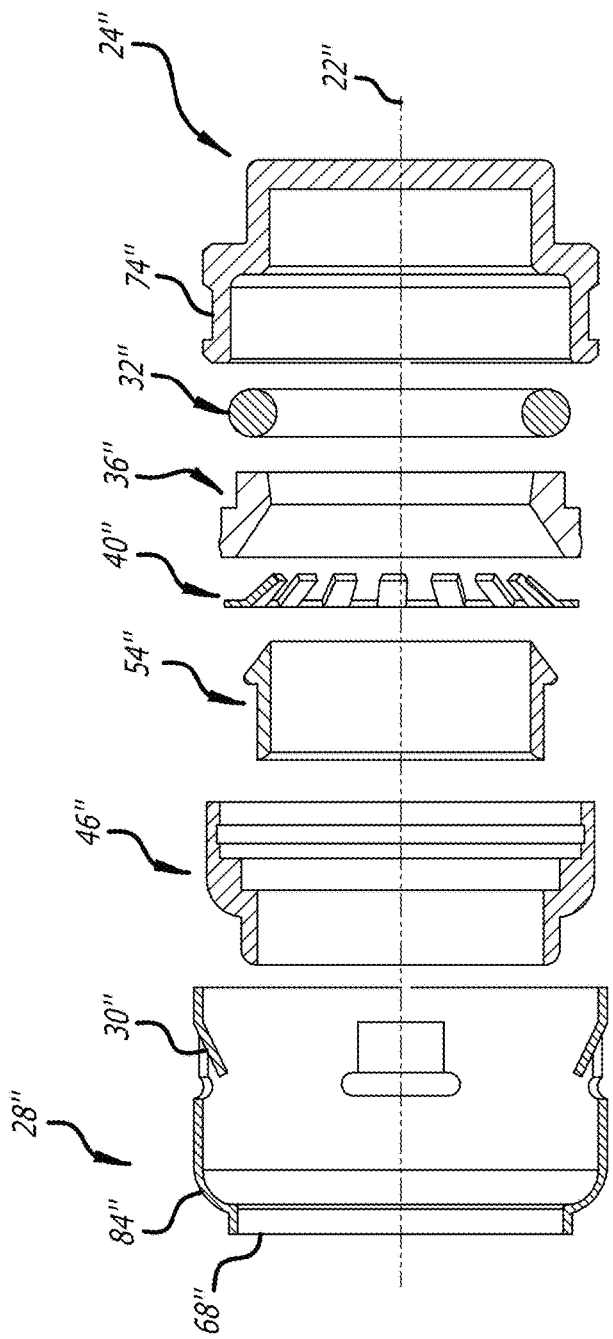
FIG. 14 is an exploded cross-sectional view of a connector, according to a further embodiment of the invention.

Separately, to illustrate that the connector of the present invention may be suitably scaled, FIGS. 14-15 illustrate a further embodiment of the present invention. The connector 20" in FIGS. 14-15 includes a connecting body 24", a sleeve 28", a sealing ring 32", a protecting ring 36", a grab ring 40", a cartridge part 46" and a demount ring 54". The components of the connector 20" are substantially similar to those of connector 20 (only different size) but with the following notable differences. In a similar manner to the connector 20', the connecting body 24" includes a uniform diameter outer surface 74'. That is, the surface 74' is in the form of a slot extending at least partway round the connecting body 24". Furthermore, the connector 20" includes sleeve 28" with a size reduction 84" connecting two offset surfaces. One of the offset surfaces forms the opening 68" whilst the other offset surface includes the latch 30" therein.

Any one of the connectors 20, 20', 20" may be provided in a kit form that includes the unassembled parts forming the connector, but preferably includes one or more of the connectors 20, 20', 20" alone, or with at least one tube configured to fit into one or more of the connector assemblies and form a fluid tight seal. Advantageously, the kit comprises a plurality of connectors 20, 20', 20" or a length of tube 70 and at least one or two connectors 20, 20', 20". The kit may include a plurality of connectors 20 and a plurality of tubes 70 sized to provide a fluid tight connection with the connector 20. Any of the above kits may include a connector body 24-24g that comprises an in-line connector, an elbow connector, a T-connector, a Y-connector, a multi-tube connector or a blind end connector, or any combination of these connector bodies 24-24g, or other connector bodies.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The above description is given by way of example, and not limitation. Given the above disclosure, one skilled in the art could devise variations that are within the scope and spirit of the invention, including various ways of connecting the demount ring 54 and the cartridge part 46, such forming an axial slot along the length of the demount ring 54, with the slot sufficiently large that the demount ring could compress enough to fit through the proximal end of the cartridge part 46 and expand so the stop flange engaged the second internal shoulder 62 on the cartridge part 46 to connect those parts. Similarly, while the latch 30 is on the sleeve 28 and the catch 26 is on the connecting body 24, the location of the parts may be reversed and other configurations of latches and catches may be used. Further, the various features of this invention can be used alone, or in varying combinations with each other and are not intended to be limited to the specific combination described herein. Thus, the invention is not to be limited by the illustrated embodiments.

In this specification, adjectives such as left and right, top and bottom, hot and cold, first and second, and the like may be used to distinguish one element or action from another element or action without necessarily requiring or implying any actual such relationship or order. Where context permits, reference to a component, an integer or step (or the alike) is not to be construed as being limited to only one of that component, integer, or step, but rather could be one or more of that component, integer or step.

In this specification, the terms 'comprises', 'comprising', 'includes', 'including', or similar terms are intended to mean a non-exclusive inclusion, such that a method, system or apparatus that comprises a list of elements does not include those elements solely, but may well include other elements not listed.

| ITEM LIST | |
|---|---|
| 20 | Connector |
| 22 | Longitudinal axis |
| 24 | Connecting body |
| 24a-24g | Connecting body |
| 26 | Catch |
| 28 | Sleeve |
| 30 | Latch |
| 32 | Sealing ring |
| 34 | Internal shoulder |
| 36 | Protecting ring |
| 38 | Distal end of ring 34 |
| 39 | Projection |
| 40 | Grab ring |
| 42 | Grab ring base |
| 44 | Grab ring teeth |
| 46 | Cartridge part |
| 48 | Tubular wall |
| 50 | Proximal end of cartridge part |
| 52 | Internal shoulder |
| 54 | Demount ring |
| 56 | Inclined distal surface on ring |
| 58 | Tubular proximal end |
| 60 | Top flange on demount ring |
| 62 | Stop on ring 46 |
| 64 | Sleeve sidewall |
| 66 | Opening in sidewall |
| 68 | Opening in proximal end of sleeve |
| 70 | First fluid tube |
| 72 | End wall or tube stop |
| 74 | Inclined exterior shoulder |
| 76 | Stop on protecting ring |
| 77 | Outward protrusion |
| 78 | Inclined inner surface on protecting ring |
| 79 | Circumferential recess |
| 82 | Inwardly inclined surface on sleeve |
| 84 | Rounded reduction in diameter on sleeve |
| 20' | Connector |
| 22 | Longitudinal axis |
| 24' | Connecting body |
| 26 | Catch |
| 28 | Sleeve |
| 30 | Latch |
| 32 | Sealing ring |
| 34 | Internal shoulder |
| 36' | Protecting ring |
| 40 | Grab ring |
| 42 | Grab ring base |
| 44 | Grab ring teeth |
| 48 | Tubular wall |
| 50 | Proximal end of cartridge part 46 |
| 52 | Internal shoulder |
| 54 | Demount ring |
| 56 | Inclined distal surface on ring 54 |
| 58 | Tubular proximal end |
| 60 | Top flange on demount ring 54 |
| 62 | Stop on ring 46 |
| 66 | Opening in sidewall |
| 68 | Opening in proximal end of sleeve |
| 72 | End wall or tube stop |
| 74' | Exterior shoulder |
| 78' | Inclined inner surface on protecting ring |
| 82 | Inwardly inclined surface on sleeve |
| 84 | Rounded reduction in diameter on sleeve |
| 86 | Flange on protecting ring |
| 88 | Ribs on protecting ring |
| 90 | Step on protecting ring |
| 20" | Connector |
| 22" | Longitudinal axis |
| 24" | Connecting body |
| 28" | Sleeve |
| 30" | Latch |
| 32" | Sealing ring |
| 36" | Protecting ring |
| 40" | Grab ring |
| 54" | Demount ring |
| 68" | Opening |
| 74" | Exterior shoulder |
| 84" | Reduction |

What is claimed is:

1. A connector comprising:
a connecting body having a fluid passage that extends at least part way therethrough;
a seal ring configured to provide a seal with an outer portion of a fluid tube;
a cartridge having a cartridge tube, the cartridge being located adjacent to the connecting body, the cartridge having a hollow portion therethrough;
a grab part having one or more teeth that are configured to retain the fluid tube, the grab part being located between the cartridge and the seal ring; and
a sleeve body having an outer surface that extends from a first end to an opposite, second end of the sleeve body, the sleeve body covering at least part of the cartridge and the connecting body;
wherein at least one latch is positioned within an aperture on the outer surface of the sleeve body between the first and second ends, and at least one mating catch is located on the connecting body for engagement with the at least one latch to connect the sleeve body to the connecting body and assist in restraining movement of the cartridge; and
wherein the cartridge tube extends through a sleeve opening.

2. The connector of claim 1, wherein the at least one latch includes a plurality of latches defined by cutouts on the outer surface of the sleeve and the at least one catch includes a plurality of catches on the connecting body.

3. The connector of claim 1, wherein the at least one latch is configured to rotate about a sidewall connected thereto in order to engage with the at least one catch.

4. The connector of claim 3, wherein the at least one latch includes one or more protrusions extending from the sidewall.

5. The connector of claim 1, wherein the at least one latch is configured to move in a direction away from and towards the at least one catch in order to engage the at least one catch.

6. The connector of claim 1, wherein the at least one latch extends transversely from a sidewall connected thereto.

7. The connector of claim 6, wherein the at least one latch extends in a direction of 5 degrees transversely to the sidewall.

8. The connector of claim 1, wherein engagement of the at least one catch with the at least one latch assists in preventing rotation of the sleeve relative to the connecting body.

9. The connector of claim 1, further comprising a demount part that remains out of engagement with the one or more teeth, and thereby does not allow the fluid tube to be released, even when an external force is applied over a distance from at least the demount part to the cartridge.

10. The connector of claim 9, wherein the external force is provided on a free end of the demount part.

11. The connector of claim 9, wherein an end of the demount part is proximal to an end of the cartridge.

12. The connector of claim 1, wherein a protecting ring is configured to assist in protecting the seal ring.

13. The connector of claim 12, wherein the protecting ring includes a stop that assists in ensuring the seal ring is captured in a space where retention of the seal ring is capable of being positioned.

14. The connector of claim 12, wherein the protecting ring includes a protrusion that assists in supporting the fluid tube.

15. A connector comprising:
a connecting body having a fluid passage that extends at least part way therethrough, the connecting body including at least one mating catch;
a seal ring configured to provide a seal with an outer portion of a fluid tube;
a cartridge having a cartridge tube, the cartridge being located adjacent to the connecting body, the cartridge having a hollow portion therethrough;
a grab part having one or more teeth that are configured to retain the fluid tube, the grab part being located between the cartridge and the seal ring; and
a sleeve body having an outer surface that extends from a first end to an opposite, second end of the sleeve body, the sleeve body covering at least part of the cartridge and the connecting body, wherein at least one latch is positioned within an aperture on the outer surface of the sleeve body between the first and second ends, and wherein the at least one mating catch engages with the at least one latch to provide a connection therebetween; and
wherein the cartridge tube extends through a sleeve opening.

16. The connector of claim 15, wherein the sleeve has at least two reduced portions between the first and second ends.

17. The connector of claim 15, wherein a protecting ring is configured to assist in protecting the seal ring.

18. The connector of claim 17, wherein the protecting ring includes a protrusion that assists in supporting the fluid tube.

19. A connector for a fluid tube having an outer diameter, the connector having proximal and distal ends and extending along a longitudinal axis, the connector comprising:
a connector body having a fluid passage extending at least part way through the connector body and a tube stop to limit passage of the fluid tube through the connector body;
a sealing ring encircling the longitudinal axis and having an internal diameter to provide a fluid tight seal with the fluid tube when the fluid tube passes through the sealing ring;
a protecting ring encircling the longitudinal axis, the sealing ring located between a shoulder on the connector body and the protecting ring;
a cartridge part having a cartridge tube, the cartridge part encircling the longitudinal axis and holding the protecting ring against the connector body;
a grab ring having a plurality of teeth encircling the longitudinal axis and extending inward and toward the connector body a distance sufficient to grab the fluid tube during use, the grab ring held between the cartridge part and the protecting ring; and
a tubular sleeve having an outer surface that extends from a first end to an opposite, second end, the tubular sleeve encircling the cartridge part and the protecting ring and part of the connector body, the tubular sleeve having a resiliently flexible latch positioned within an aperture on the outer surface thereof between the first and second ends for latching the tubular sleeve to the connector body, holding the cartridge part against the protecting ring, and holding the protecting ring against the connector body, the sleeve having a proximal end with a sleeve opening through which the fluid tube passes;
wherein the cartridge tube also extends through the sleeve opening.

20. The connector of claim 19, wherein the tubular sleeve has at least two reduced portions between the first and second ends.

* * * * *